US012523538B2

(12) United States Patent
Spring

(10) Patent No.: US 12,523,538 B2
(45) Date of Patent: Jan. 13, 2026

(54) METHOD FOR PRODUCING A METAL PLATE HAVING AN EMBEDDED TEMPERATURE SENSOR AND METAL PLATE PRODUCED THEREBY

(71) Applicant: Alinox AG, Eschlikon (CH)

(72) Inventor: Markus Spring, Eschlikon (CH)

(73) Assignee: Alinox AG, Eschlikon (CH)

( * ) Notice: Subject to any disclaimer, the term of this patent is extended or adjusted under 35 U.S.C. 154(b) by 1077 days.

(21) Appl. No.: 17/041,711

(22) PCT Filed: Apr. 3, 2019

(86) PCT No.: PCT/EP2019/058391
§ 371 (c)(1),
(2) Date: Sep. 25, 2020

(87) PCT Pub. No.: WO2019/193044
PCT Pub. Date: Oct. 10, 2019

(65) Prior Publication Data
US 2021/0041302 A1 Feb. 11, 2021

(30) Foreign Application Priority Data
Apr. 6, 2018 (DE) ...................... 10 2018 108 240.1

(51) Int. Cl.
*G01K 1/14* (2021.01)
*A47J 27/00* (2006.01)
(Continued)

(52) U.S. Cl.
CPC .............. *G01K 1/14* (2013.01); *A47J 27/002* (2013.01); *A47J 36/02* (2013.01); *A47J 36/32* (2013.01);
(Continued)

(58) Field of Classification Search
None
See application file for complete search history.

(56) References Cited

U.S. PATENT DOCUMENTS 3,937,387 A * 2/1976 Fletcher ............... B23K 35/002
228/206
6,127,064 A * 10/2000 Shibata ............... H01M 50/133
429/166
(Continued)

FOREIGN PATENT DOCUMENTS

CN 206534507 U 10/2017
DE 202004009968 U1 10/2004
(Continued)

OTHER PUBLICATIONS

International Search Report for PCT patent application PCT/EP2019/058391 issued on Aug. 2, 2019 by the European Patent Office, translation provided.
(Continued)

Primary Examiner — Erica S Lin
(74) Attorney, Agent, or Firm — Shakir Law PLLC; Hassan Abbas Shakir

(57) ABSTRACT

A method for producing a metal plate having at least one embedded the temperature sensor and to a metal plate produced by the method. The metal plate is produced from a plurality of layers or plate bodies, which are diffusion-connected to each other by thermal pretreatment and subsequent rolling. A sheathed thermocouple is rolled, as the temperature sensor, into the metal plate during the production of the metal plate, or a protective tube made of metal is rolled into the metal plate, into which protective tube a sheathed thermocouple can be inserted after the metal plate has been processed further to form a cooking vessel.

12 Claims, 4 Drawing Sheets

(51) Int. Cl.
  *A47J 36/02* (2006.01)
  *A47J 36/32* (2006.01)
  *A47J 37/10* (2006.01)
  *G01K 1/12* (2006.01)
  *G01K 7/06* (2006.01)
(52) U.S. Cl.
  CPC ................ A47J 37/10 (2013.01); G01K 1/12 (2013.01); G01K 7/06 (2013.01); *A47J 2202/00* (2013.01)

(56) References Cited

U.S. PATENT DOCUMENTS

| | | | | |
|---|---|---|---|---|
| 2007/0257023 | A1* | 11/2007 | Watanabe | H01L 21/67103 29/428 |
| 2010/0101553 | A1* | 4/2010 | Dotti | F23D 14/725 374/E7.004 |
| 2013/0068775 | A1* | 3/2013 | Maravic | B21D 22/20 220/573.1 |
| 2017/0231415 | A1* | 8/2017 | Cheng | A47J 36/321 374/141 |

FOREIGN PATENT DOCUMENTS

| | | |
|---|---|---|
| DE | 10 2007 054 071 A1 | 5/2009 |
| EP | 2 525 938 B1 | 7/2013 |
| FR | 2302174 A1 | 9/1976 |
| FR | 2617423 A1 | 1/1989 |
| GB | 1515951 A | 6/1978 |
| JP | H07314055 A | 12/1995 |
| JP | 2004071363 A | 3/2004 |
| JP | 2018036188 A | 3/2018 |
| WO | 2005018393 A1 | 3/2005 |
| WO | 2017134017 A1 | 8/2017 |

OTHER PUBLICATIONS

Written Opinion for PCT patent application PCT/EP2019/058391 issued on Aug. 2, 2019 by the European Patent Office, translation provided.

Search Report for German patent application DE 10 2018 108 240.1 issued on Jan. 17, 2019, partial machine translation provided.

* cited by examiner

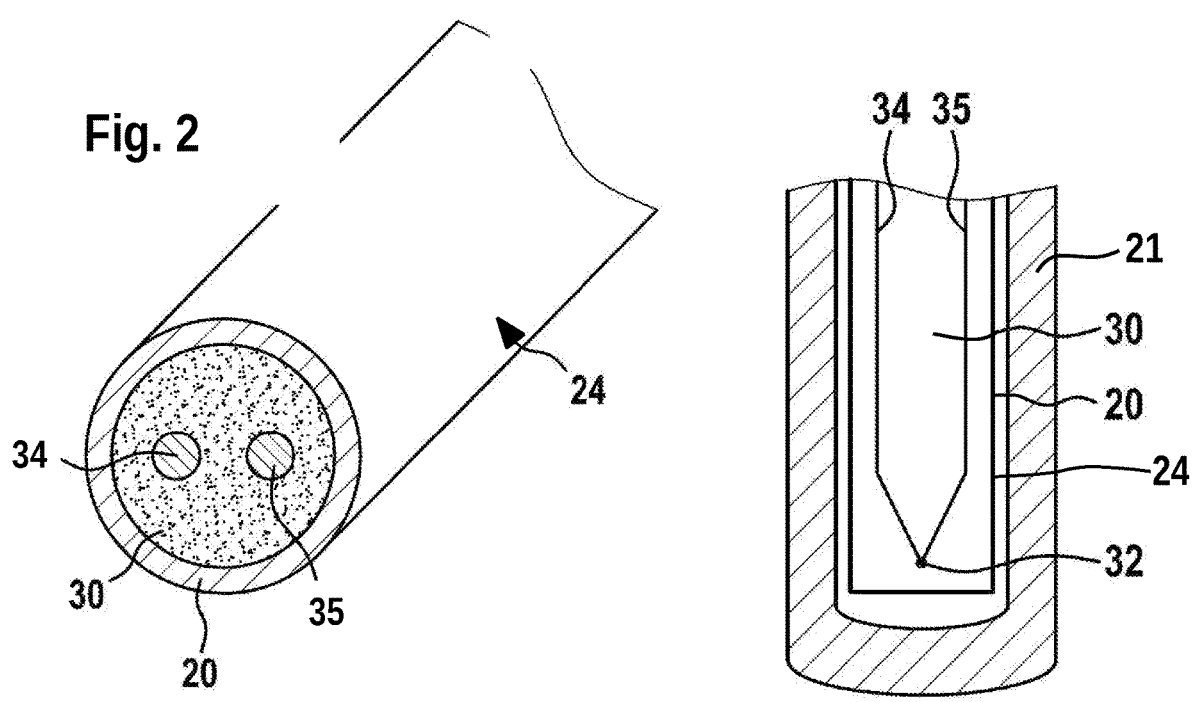

METHOD FOR PRODUCING A METAL PLATE HAVING AN EMBEDDED TEMPERATURE SENSOR AND METAL PLATE PRODUCED THEREBY

BACKGROUND OF THE INVENTION

1. Field of the Invention

The invention relates to a method for producing and, where required, processing a metal plate provided or retrofittable with at least one embedded temperature sensor.

2. Discussion of the Related Art

The invention further relates to a metal plate produced by this method and provided or retrofittable with at least one embedded temperature sensor.

A similar method is known from the document EP 2 525 938 B1. In the metal plate produced by this known method which includes, in addition to an embedded heating element, an embedded temperature sensor, the temperature sensor has a prominent measuring head from which two wires extend to the outside of the metal plate. The temperature sensor having the pronounced measuring head should consist of a ceramic body into which the electric circuit of the temperature sensor is embedded. Due to the ceramic body, the plate body or bodies made of aluminium or an aluminium alloy need(s) to have a recess for the ceramic body so that it will not be destroyed during the rolling process. The necessity of the provision of such a recess for each ceramic body renders the rolling process complicated and expensive. In addition, there are such temperature sensors in the form of $P_{t100}$ and $P_{t1000}$, however, they are usually made of plastic. This means that a wound platinum wire is not embedded in ceramic but in plastic. Such temperature sensors are also unsuitable for a metal plate to be produced by rolling because, in the present case, temperatures of approximately 380° C. occur during rolling.

Document DE 10 2007 054 071 A1 relates to a composite metal item consisting of a plurality of layers, one of these being provided with strip-shaped recesses. Even though a tubular body may be embedded in this composite metal item, embedding in the metal is only carried out after the tubular body is inserted in a recess the cross-sectional shape of which is preferably adapted to the cross-sectional shape of the tubular body. The tubular body is then embedded in the metal by pressing the metallic layers of the composite metal item together. Before or after they are pressed together, another body can be inserted into the tubular body. The other body may be a temperature sensor, for example a wire-shaped sensor.

Another problem which should be given particular consideration here would arise if the metal plate were to be mechanically processed by being thermoformed, for example for producing cooking pots or frying pans. Namely, such cooking or frying vessels have a radius at the transition from the base to the upright wall, i.e. a curvature around which the connecting wires of the temperature sensor would have to be drawn if it was embedded in the base. The wire would have to be bendable and should, under no circumstances, break during this process. It would also have to be stretchable since the material to be thermoformed is drawn and stretched the most in the area of the curvature where the wall transitions into the base. If the temperature sensor is fixedly embedded in the metal plate the wire would have to withstand the same elongation the metal plate is subjected to during deep drawing. Another problem results from the necessity to insulate the wires of the temperature sensor with respect to each other and with regard to the metal plate. Normal wire insulations, however, are nowadays made of plastic which would not even withstand the rolling process, let alone a deep-drawing process.

In order to circumvent these problems, it is common in modern thermoformed kitchen vessels used for frying or cooking and frequently having a thick base suitable for induction cooking to provide a hole into which a temperature sensor provided with connecting wires could be inserted up to the centre of the base in the base of the finished thermoformed vessel in parallel to the plane of the base from the outer side of the kitchen vessel. The temperature sensor is provided to render control of the cooking process possible with its aid. To this end, the vessel has to be capable of a wireless transmission of a signal to a control device in which the signal is processed and the induction or other heating of the vessel is adapted to a specific food preparation program. A specific problem arising when incorporating the temperature sensor in the vessel is that only a straight hole can be produced in the base. Therefore, the connecting wires of the temperature sensor have to be drawn upwards along the outside of the wall of the vessel from the entry of the hole, for example to a transponder which will carry out the wireless transmission of the temperature signal from the temperature sensor. In order to protect the connecting wires of the temperature sensor and the transponder from damage and to not affect the optical appearance of the vessel, usually, the connecting wires of the temperature sensor and the transponder are hidden under a suitably dimensioned handle or panhandle attached to the outer side of the vessel's wall. If the vessel is a pot a corresponding handle which, however, has to have the same, relatively large dimensions of the handle mentioned first is attached to the outer side on the opposite side of the vessel. All of this is not quite advantageous with regard to the appearance of vessel.

SUMMARY OF THE INVENTION

It is the object of the invention to provide a method for producing a metal plate which includes at least one embedded temperature sensor and which renders the elimination of the above-mentioned drawbacks possible.

According to the invention, this object is solved by a method of the type mentioned in the introduction which is characterised by the following steps: arranging at least one metallic protective tube which is the sheath of a sheathed thermocouple or a conduit into which a temperature sensor, preferably a sheathed thermocouple, is insertable after the production and, if required, processing of the metal plate between a first and a second plate body which are not provided with recesses for accommodating the or each protective tube and which are made of aluminium and/or of an aluminium alloy, respectively, embedding the or each protective tube, in direct contact, in the first and the second plate body by compression and material displacement of the first and of the second plate body by rolling and thereby connecting the entire surfaces of the plate bodies, wherein the plate bodies are heat pre-treated at a temperature which is higher than the recrystallisation temperature of aluminium or the aluminium alloy but lower than the melting point of aluminium and then pressed against each other by the rolling so as to effect the embedment of the or each protective tube in the plate body, wherein the plate bodies undergo mutual diffusion bonding in the area of their sides contacting each other, whereby the plate bodies are materially connected to each other and to the or each protective tube across the entire surface area to form the metal plate to be produced.

Further, the object of the invention is solved by a metal plate produced by this method, provided or retrofittable with at least one embedded temperature sensor, and comprising: at least one protective tube of the temperature sensor which is arranged between the first and the second plate body which are made of aluminium or an aluminium alloy, respectively, and were not provided with recesses for accommodating the or each protective tube prior to the rolling, wherein the or each protective tube is, in direct contact, embedded in the first and the second plate body, wherein the first and the second plate body are materially connected to each other and to the or each protective tube across the entire surface area, and wherein all plate bodies comprise a mutual diffusion connection in the area of their contacting sides so that all plate bodies are materially connected to each other and to the or each protective tube across the entire surface area to form the metal plate to be produced.

The basic concept underlying the invention is to be seen in that, in the rolling process involved in the production of the metal plate formed of plate bodies, a protective tube which is the sheath of a sheathed thermocouple or a conduit into which a temperature sensor, preferably a sheathed thermocouple, is insertable after the production and, if required, mechanical processing of the metal plate by thermoforming is rolled into the metal plate. The protective tube is preferably a thin tube having a diameter of, for example, approximately 1.5 mm in which the connecting wires of a temperature measuring head, preferably the thermocouple wires of a thermopair, are movably accommodated or supported by and insulated from the wall of the protective tube by ceramic powder or the like. This protective tube which may, incidentally, be the sheath of a sheathed thermocouple which may be rolled into the metal plate from the outset, or only inserted into it subsequent to its production, will withstand the deformation involved in the production of the metal plate and the subsequent thermoforming since the connecting wires of the thermopair are relatively movable within the tube and will also survive the deformation. Furthermore, these connecting wires have no insulation made of plastic or the like that would prevent this. According to the invention, no previously produced recesses which would then accommodate the protective tube or the thermocouple or the like including its wires prior to the rolling process are provided in the plate bodies. Even though the protective tube will frequently be slightly oval instead of perfectly circular after the rolling process, it will, nevertheless, in any case retain a sufficient clear width so that, in case the protective tube is the sheath of a sheathed thermocouple, it will remain undamaged, or that, in the other case in which the protective tube is a conduit, a sheathed thermocouple can be conveniently inserted into the protective tube subsequently. Essential to the invention is that, for embedding the tubular body in the metal layers of the composite metal item, no recess if not recess adapted to the cross-section of the tubular body has to be produced in advance since the tubular body is directly embedded in the metal when the layers are pressed together.

Embodiments of the invention are the subject matters of the dependent claims.

In one embodiment of the method according to the invention, the two plate bodies as the core layers are arranged between two cover layers formed by a third and a fourth plate body and made of another metal such as stainless steel prior to rolling and materially diffusion-connected to each other and to the other two plate bodies across the entire surface area during rolling. The finished metal plate according to the invention has no air gap which could affect thermal conductivity at all. The metal plate is therefore ideally suited for further processing into a kitchen vessel of the type described above which can be used for so-called intelligent cooking in which the kitchen vessel has to be capable of providing a temperature signal to render an associated control of the heating device used for a cooking process (preferably an induction heater) possible.

In a further embodiment of the method according to the invention, the metal plate is in a state after rolling or brought into a state by post heat treatment in which it can be further processed by mechanical reshaping, preferably into a kitchen vessel used for intelligent cooking.

In a further embodiment of the method according to the invention, a sheathed thermocouple is used in which two thermocouple wires are embedded in a core enclosed in a sheath and made of a ceramic- or mineral-based material or a heat-resistant plastic material.

In a further embodiment of the method according to the invention, the metal plate is reshaped into a cooking or frying vessel comprising a base and a wall extending upwards therefrom with a radius by thermoforming after rolling, and then one end of the protective tube in the outer side of the wall is exposed for an electrical connection of the temperature sensor. The invention provides for the advantage that the exposure position can be provided in a suitable position and covered without the optical appearance of the kitchen vessel being affected.

The metal plate produced by the method according to the invention is provided or retrofittable with at least one embedded temperature sensor and comprises: at least one protective tube of the temperature sensor arranged between the first and the second plate body which are formed of aluminium or an aluminium alloy, respectively, and were not provided with recesses for accommodating the or each protective tube prior to rolling, wherein the or each protective tube is, in direct contact, embedded in the first and the second plate body, wherein the first and the second plate body are materially connected to each other and to the or each protective tube across the entire surface area, and wherein all plate bodies are mutually diffusion bonded in the area of their mutually contacting sides so that all plate bodies are materially connected to each other and to the or each protective tube across the entire surface area to form the metal plate to be produced.

In one embodiment of the metal plate according to the invention, the first and the second plate body are, as core layers, arranged between two cover layers which are embodied by a third and a fourth plate body and made of another metal such as stainless steel, and materially diffusion-connected to each other as well as to the third and the fourth plate body across the entire surface area. This embodiment of the metal plate is particularly suitable for the production of kitchen vessels of the above-mentioned type which can be produced from the metal plate by thermoforming without the protective tube being rendered unusable or a sheathed thermocouple inserted in the metal plate, while, nevertheless, extending up into the wall of the kitchen vessel and not only into its base, being damaged by rolling.

In a further embodiment of the metal plate according to the invention, it is in a state after rolling or can be brought into a state by post heat treatment in which it can be further processed by mechanical reshaping. One or no post heat treatment is particularly appropriate for some metals which are deployed in the invention.

In a further embodiment of the metal plate according to the invention, it is provided with a thermocouple in which the two thermocouple wires are embedded in an insulation enclosed by a sheath and made of a mineral-based material or a heat-resistant plastic material as the temperature sensor.

In a further embodiment of the metal plate according to the invention, the temperature sensor is a sheathed thermocouple which was inserted into the protective tube prior to the rolling process and rolled into the metal plate together with the protective tube in the rolling process or which was rolled into the metal plate instead of the protective tube. A particular advantage of the method according to the invention is therefore that a sheathed thermocouple can already be rolled in during the production of the metal plate or still be inserted into the protective tube after the completion of the rolling process and after thermoforming.

Another embodiment of the metal plate according to the invention is a cooking or frying vessel produced therefrom for which the metal plate was reshaped by thermoforming and which has a base transitioning into a wall which extends upwards from the base with a radius and on the outer side of which one end of the protective tube is exposed for an electrical connection of the temperature sensor.

BRIEF DESCRIPTION OF THE DRAWINGS

Embodiments of the invention will be described below in more detail with reference to the drawings in which:

FIG. 2 shows a cross-sectional view of a sheathed thermocouple, FIG. 3 shows a longitudinal cross-sectional view of a configuration in which a sheathed thermocouple is disposed in a protective tube.

DETAILED DESCRIPTION OF THE INVENTION

The invention relates to the production and, if required, processing of a metal plate 10 provided or retrofittable with at least one embedded temperature sensor. During the production of the metal plate 10, various steps not mentioned in the introduction which are common in the state of the art in the production of a diffusion bond between metals such as cleaning the metal surfaces, thermally pre-treating the plate bodies and rolling them for achieving a mutual diffusion bond and, if required, post heat treatment have to be performed. Even though these additional steps are not described here, it should be noted that, if plate bodies made of aluminium or an aluminium alloy are connected to each other by the method according to the invention which is preferably achieved by rolling, the surfaces of each aluminium layer are heated to a temperature which is higher than the recrystallisation temperature of aluminium but lower than the melting point of aluminium before being pressed together. Preferably, the metal plate 10 produced in this way is finally annealed, whereafter it can then be further processed and reshaped by mechanical processing in the process, for example by thermoforming.

Figure 1:
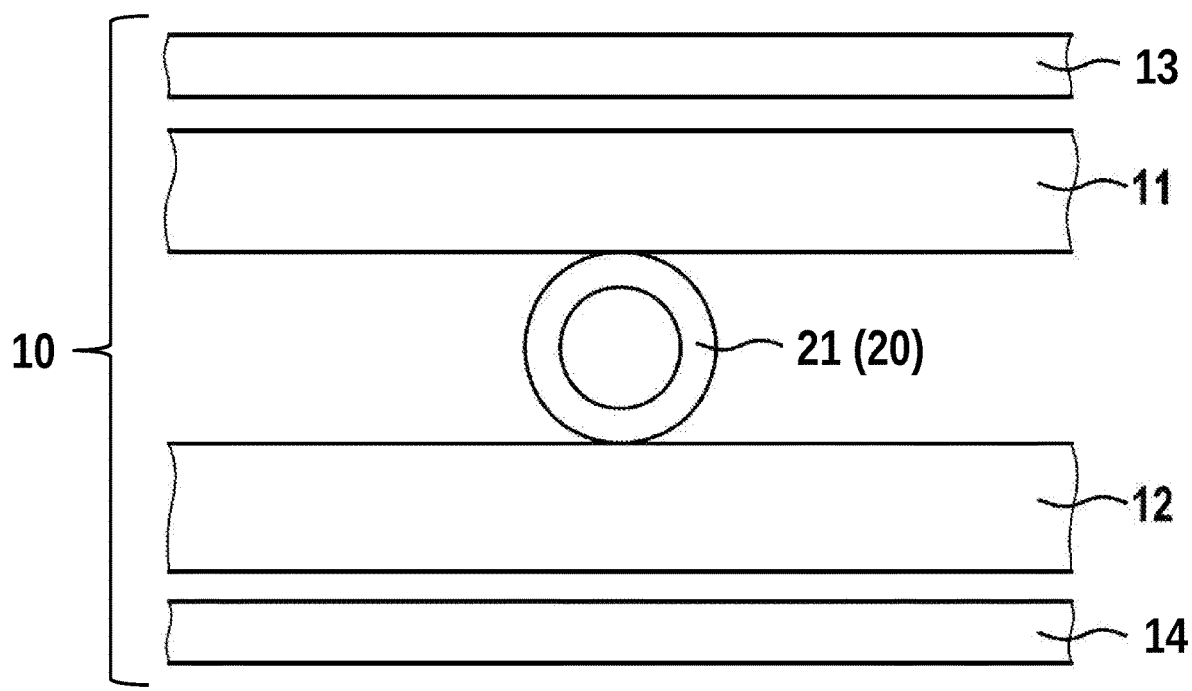
FIG. 1 shows a cross-sectional view of an arrangement of plate bodies with an interposed protective tube for carrying out the method according to the invention in which a protective tube is rolled into the plate bodies without recesses in the plate bodies previously produced for this purpose being required.

FIG. 1 shows a cross-sectional view of four plate bodies arranged on top of each other, namely a first plate body 11 made of aluminium (for the sake of convenience, the indication of the aluminium alloy is omitted in the following description whilst it is clear that an aluminium alloy can be used instead of aluminium). A second plate body 12 is also made of aluminium. A third plate body 13 and a fourth plate body 14 are respectively made of stainless steel or titanium. The rolling is performed in a roll gap between two rolls which, like a remaining rolling mill, are not illustrated here. The configuration, however, substantially corresponds to the configuration known from the document EP 2 525 938 B1. Since a cooking vessel 22, 22' (FIG. 5 or FIG. 6) formed by thermoforming a multi-layer material is to be produced from the metal plate 10 to be produced according to the invention, the two outer layers of the metal plate 10 to be produced, namely, the plate bodies 13, 14, are made of stainless steel, respectively. The plate bodies 13, 14 form one of the two cover layers of the metal plate 10 to be produced, respectively.

Figures 5, 6:
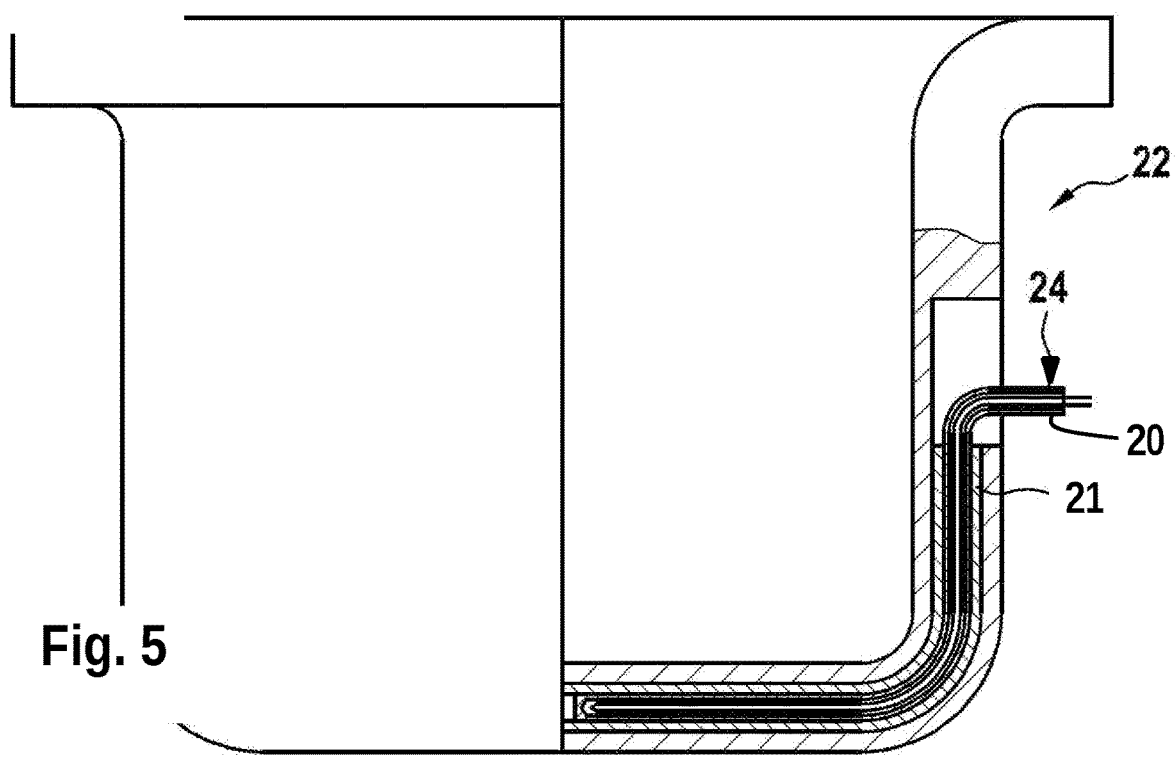
FIGS. 5 and 6 show cross-sectional views of a cooking vessel according to two embodiments of the invention respectively illustrated as a pot.

According to the cross-sectional view of FIG. 1, a protective tube 21 (20) which may either be a sheath 20 of a sheathed thermocouple 24 as shown in FIG. 2 or a protective tube 21 for accommodating a sheathed thermocouple 24 is placed between the plate bodies 11, 12 without the aid of a recess. In the latter case, the sheathed thermocouple 24 is only inserted in the protective tube 21 after the completion of the metal plate 10 or of the cooking vessel produced from the finished metal plate (FIG. 5).

In the arrangement of plate bodies 11, 12, 13, 14 shown in FIG. 1, accordingly, the sheath 20 or the protective tube 21 is rolled into the plate bodies 11, 12 in the rolling process which involves material displacement, however, with the protective tube 21 or the sheath 20 consisting of a metal which is so hard that it substantially retains its perfectly circular form shown in the cross-section. In the rolling process, the plate bodies 11 and 12 previously heated to a temperature which is higher than the recrystallisation temperature of aluminium or the aluminium alloy but lower than the melting point of aluminium by thermal pre-treatment are thermally pre-treated and then pressed against each other by rolling to accomplish the embedment of the protective tube 21 (20) in the plate bodies 11, 12 in which all plate bodies undergo mutual diffusion bonding in the area of their mutually contacting sides whereby all plate bodies are materially connected to each other and to the protective tube 21 (20) across the entire surface area to form the metal plate to be produced.

In the arrangement of plate bodies 11-14 shown in FIG. 1, the two plate bodies 11, 12 as the core layers are arranged between two cover layers which are formed by the third and the fourth plate body 13 or 14 and are made of another metal, preferably of stainless steel or titanium, prior to rolling. In the rolling process, all plate bodies are materially diffusion-connected to each other across the entire surface area.

Experiments have shown that additional advantages can be achieved by providing each of the plate bodies 11, 12 with a thin plating in the form of a layer of pure aluminium on both sides when the two plate bodies 11, 12 are made of an aluminium alloy. As an example, at a thickness of the plate bodies 11, 12 of 1 mm, respectively, the thickness of the plating of pure aluminium is approximately 5 to 10%, respectively. This embodiment of the invention is not illustrated in the drawings. It is included in claim 1 in that, in step a) of the method according to the invention, the first and the second plate body 11, 12 may be made of aluminium and/or an aluminium alloy, respectively.

Preferably, the metal plate is in a state after rolling or can be brought into a state by post heat treatment in which it can be further processed by mechanical reshaping, for example by thermoforming.

As the temperature sensor, a sheathed thermocouple 24 as schematically shown in a cross-sectional view in FIG. 2 is used. In the embodiment shown in FIG. 2, two thermocouple wires 34, 35 are enclosed by a sheath 20. The sheath 20 may, like the protective tube 21, be made of stainless steel, and it may be bendable. The illustration of the thickness of the sheath 20 and of the protective tube 21 in the accompanying drawings is merely schematic and does not reflect the actually employed thickness ratios. In the embodiment shown in FIG. 2, the two thermocouple wires 34, 35 illustrated in the cross-section form a thermopair 32 shown in FIG. 3. Its insulation 30 may be made of magnesium oxide or a heat-resistant plastic material. The sheath 20 of the thermocouple 24 may also be made of stainless steel. The mutual arrangement of the thermocouple wires 34, 35, sheath 20, protective tube 21, and insulation 30 shown in FIG. 3 is respectively selected so that a sheathed thermocouple 24 can be subsequently inserted into the protective tube 21 as shown in FIG. 5, or so that a sheathed thermocouple 24 the sheath 20 of which serves as the protective tube can be rolled into the plate bodies 11, 12 as shown in FIG. 6.

In the illustration of FIG. 3, the thermopair 32 including two thermocouple wires 34, 35 is arranged in the sheath 20 of the sheathed thermocouple 24. In the embodiment according to FIG. 5, the sheathed thermocouple 24 is inserted into the protective tube 21 which is preferably made of stainless steel. The thermopair 32 having the ceramic insulation 30 is located directly the sheath 20. The protective tube 21 is preferably made of heat-resistant stainless steel.

Figure 4:
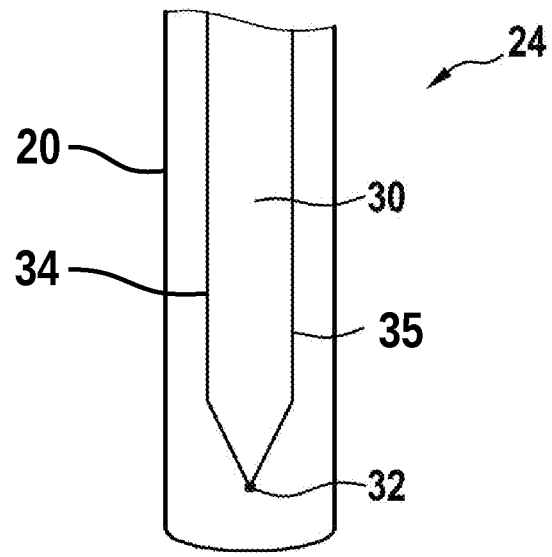
FIG. 4 shows a longitudinal cross-sectional view of the configuration according to FIG. 3 which, however, shows the sheathed thermocouple without the protective tube.

FIG. 4 shows a longitudinal cross-sectional view of the sheathed thermocouple 24 without the protective tube 21. The sheath 20 of the sheathed thermocouple 24 is thin-walled and is, for example, made of heat-resistant stainless steel (Inconel 600). The thermocouple wires 34, 35 (FIG. 3) are made of a thermal material and are embedded in pressed fire-resistant magnesium oxide. The sheathed thermocouple 24 is altogether bendable. In an embodiment realised by the Applicant the sheathed thermocouple 24 has an outer diameter of preferably 1.5 millimetres prior to rolling.

The sheathed thermocouple 24 shown in FIG. 4 is based on a mineral-insulated sheath. The insulation 30 is fire-resistant magnesium oxide powder. The bendability of the sheathed thermocouple 24 renders bending radiuses realisable which enable the use of the sheathed thermocouple in positions of a cooking vessel which are otherwise difficult to access such as, for example, in the base of a cooking vessel 22 as shown in FIG. 5, or in the base of a cooking vessel 22' as shown in FIG. 6.

LIST OF REFERENCE NUMERALS 10 metal plate
11 first plate body
12 second plate body
13 third plate body
14 fourth plate body
20 sheath
21 protective tube
22 cooking vessel
22' cooking vessel
24 sheathed thermocouple
30 insulation
32 thermopair
34, 35 thermocouple wires

What is claimed is:

1. A method for producing and processing a metal plate which is formed of plate bodies and provided or retrofittable with at least one embedded temperature sensor, the method comprising the steps of:
    a) arranging at least one metallic protective tube which is a sheath of a sheathed thermocouple or an empty tube into which the at least one temperature sensor is insertable after the production and, if required, processing of the metal plate between a first plate body and a second plate body which are not provided with recesses for accommodating the protective tube or each protective tube and which are made of aluminium or an aluminium alloy, respectively,
    b) embedding the protective tube or each protective tube, in direct contact, in the first and the second plate body by compression and material displacement of the first and the second plate body by rolling, and
    c) connecting the entire surfaces of the plate bodies,
    wherein the plate bodies are thermally pre-treated at a temperature which is higher than the recrystallisation temperature of aluminium or the aluminium alloy but lower than the melting point of aluminium and then pressed against each other by the rolling to accomplish the embedment of the protective tube or each protective tube in the plate bodies,
    wherein the plate bodies undergo mutual diffusion bonding in the area of their sides contacting each other, wherein the plate bodies are materially connected to each other and to the protective tube or each protective tube across the entire surface area to form the metal plate to be produced,
    reshaping the metal plate is into the cooking or frying vessel including a base and a wall extending upwards therefrom with a radius by thermoforming after rolling and in that then one end of the sheath or the protective tube is exposed on the outer side of the wall for an electrical connection of the at least one temperature sensor.

2. The method according to claim 1, wherein the first plate body and the second plate body as the core layers are arranged between two cover layers formed by a third plate body and a fourth plate body and made of another metal prior to rolling and materially diffusion-connected to each other and to the other two plate bodies across the entire surface area during rolling.

3. The method according to claim 1, wherein the metal plate is in a state after rolling or can be brought into a state by post heat treatment in which it can be further processed by mechanical reshaping.

4. The method according to claim 1,
    wherein the temperature sensor is a sheathed thermocouple;
    wherein the sheathed thermocouple comprises two thermocouple wires embedded in a core in a sheath and made of a mineral-based material or a heat-resistant plastic material.

5. A cooking or frying vessel produced from a metal plate, provided or retrofittable with at least one embedded temperature sensor, the cooking or frying vessel comprising:
    at least one metallic protective tube which is a sheath of a sheathed thermocouple or an empty tube into which the at least one temperature sensor is insertable which is arranged between the first and the second plate body which are made of aluminium or an aluminium alloy, respectively, and were not provided with recesses for accommodating the protective tube or each metallic protective tube prior to the rolling, wherein the protective tube or each metallic protective tube is, in direct contact, embedded in the first and the second plate body, wherein the first and the second plate body are materially connected to each other and to the protective tube or each metallic protective tube across the entire surface area, and wherein all plate bodies have a mutual diffusion connection in the area of their contacting sides so that all plate bodies are materially connected to each other and to the protective tube or each metallic protective tube across the entire surface area to form the metal plate to be produced;

wherein the metal plate was, by thermoforming, reshaped into the cooking or frying vessel having a base transitioning into a wall which extends upwards from the base with a radius and on the outer side of which one end of the sheath of the sheathed thermocouple or one end of the empty tube can be exposed for an electrical connection of the temperature sensor.

6. The cooking or frying vessel according to claim 5, wherein the first plate body and the second plate body as the core layers are arranged between two cover layers formed by a third plate body and a fourth plate body and made of another metal such as stainless steel and materially diffusion-connected to each other as well as to the third plate and the fourth plate body across the entire surface area.

7. The cooking or frying vessel according to claim 5, wherein it is in a state after rolling or can be brought into a state by post heat treatment in which it can be further processed by mechanical reshaping.

8. The cooking or frying vessel according to claim 5, wherein the temperature sensor is a sheathed thermocouple;
wherein the sheathed thermocouple comprises two thermocouple wires embedded in a core enclosed in a sheath and made of a mineral-based material or a heat-resistant plastic material.

9. The cooking or frying vessel according to claim 7, wherein the temperature sensor is a sheathed thermocouple which was inserted into the protective tube prior to the rolling process and rolled into in the metal plate together with the protective tube in the rolling process or which was rolled into in the metal plate instead of the protective tube.

10. The cooking or frying vessel according to claim 5, wherein the at least one temperature sensor is a sheathed thermocouple.

11. The method according to claim 1, wherein the at least one temperature sensor is a sheathed thermocouple.

12. The method according to claim 2, wherein the another metal is stainless steel.

\* \* \* \* \*